E. E. A. SOREL.
BUSH OR BEARING.
APPLICATION FILED OCT. 12, 1917.

1,300,501.

Patented Apr. 15, 1919.

Inventor:
Emile Eugène Albert Sorel
per H. W. Plucker
Attorney.

UNITED STATES PATENT OFFICE.

EMILE EUGÈNE ALBERT SOREL, OF PARIS, FRANCE.

BUSH OR BEARING.

1,300,501.

Specification of Letters Patent.   Patented Apr. 15, 1919.

Application filed October 12, 1917.   Serial No. 196,328.

*To all whom it may concern:*

Be it known that I, EMILE EUGÈNE ALBERT SOREL, a citizen of the French Republic, residing at 24 Rue de Bondy, Paris, in the Republic of France, have invented certain new and useful Improvements in Bushes or Bearings, of which the following is a specification.

The present invention relates to a bush with a lubricating lining which, owing to its special construction, exhibits very great strength and may be constructed very economically.

This bush device comprises essentially a frame which may be made of any metal, and a lubricating lining forming the active part of the bush mounted inside the said frame.

This lubricating lining consists of a composition comprising a lubricating substance such as graphite to which may be added a fatty substance with a view to increasing the lubricating properties of the composition. A hardening substance such as powdered magnesia may further be incorporated with the mixture, and I preferably give the mass a pasty consistency suitable for molding purposes by mixing therewith a solution of chlorid of magnesium which also acts as a binding medium when the mass is dried.

By way of example, an agglomerate having the following composition may be employed:—

Ground graphite_____ 50 to 200 grams.
Powdered magnesia____ 100 grams.

These elements are mixed together and with a solution of chlorid of magnesium added. The paste thus obtained is then molded.

The setting is effected in about 24 hours, and the maximum hardness is attained at the end of about a fortnight.

Of course the above mentioned proportions are only given by way of illustration and may be modified according to the quality of product to be obtained. The proportion of magnesia should be greater according as the product is to be harder.

The graphite might also be mixed with other substance, such as gum-lac, vulcanized india-rubber, hardened plaster, etc.

With a view to increasing the lubricating property of the lining a solid fatty body, such as stearin for instance, may be introduced into the mixture.

In the event of it being desired to manufacture very economical bushes the graphite might be replaced by anthracite, coal or talc in a powdered state.

In order to fine-bore and adjust this lubricating packing, it will be advantageous to work it before it is quite hard.

The graphite paste may either be applied directly, before hardening, to the interior of the frame of the bush or else molded separately and then fixed into the frame after it has set.

The accompanying drawing shows by way of example the present bush device.

Fig. 5 being a cross section taken along the line A—A of Fig. 6, and Fig. 6 is a longitudinal section taken along the line B—B of Fig. 5.

Figure 1:
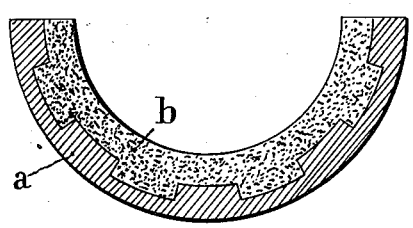
Figure 1 shows in cross section one constructional form of this bush.

As shown in Fig. 1, the bush comprises a frame $a$, generally of metal, and an inner lubricating lining $b$, constituted as has been described above.

In order to insure the effective uniting of the lining to the framing the latter may comprise on its internal surface, as shown in the drawing, grooves intended to receive the lubricating composition.

Figure 2:
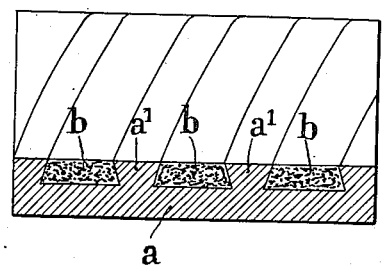
Figs. 2 and 3 show in longitudinal section and in plan another constructional form.
Figure 3:
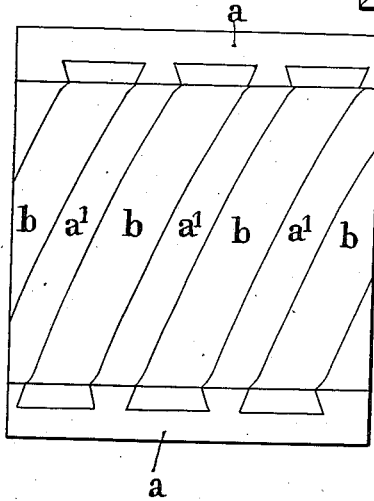

The present bush may also be constructed, as illustrated in Figs. 2 and 3, in such a way as to present a rubbing surface half metallic and half lubricating.

In this case the framing $a$, consisting of bronze or any other suitable alloy or metal, is provided with ribs $a^1$ with cavities between them in which the lubricating composition $b$ is lodged. These ribs $a^1$ are preferably helical in shape, so that the same points on the shaft rotating within the bearing rub alternately on a lubricating surface and on a metallic surface.

The present bush device with lubricating lining may be applied to the construction of all kinds of bearings.

Figure 4:
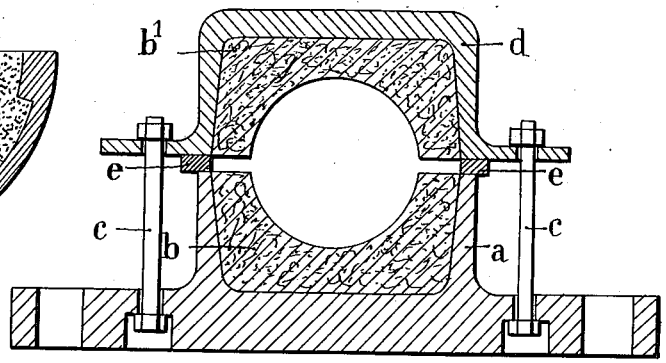
Fig. 4 shows in vertical cross section a bearing constructed according to the present invention.

The bush device illustrated in Fig. 4 comprises a trough-shaped block $a$ of metal or other material, inclosing the lubricating lining $b$, consisting of an agglomerate of graphite as has been stated above. On this block $a$ is mounted and fixed by means of bolts $c$ a cap $d$, also inclosing a lubricating lining $b^1$. In these lubricating linings $b$ and $b^1$ semi-cylindrical bores are made, the radii of which are equal to that of the shaft that has to rotate in the bearing. Packing-pieces $e$ of compressible material may be interposed between the cap $d$ and the block $a$ of the bearing.

Furthermore any lubricating device may be applied to this bearing device, either a solid-grease lubricator carried by the cap of the bearing or an arrangement for oil lubrication.

Figure 5:
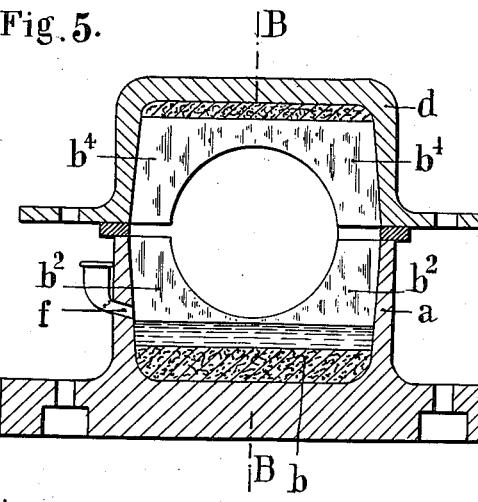
Figs. 5 and 6 show another constructional form, with oil lubrication.
Figure 6:
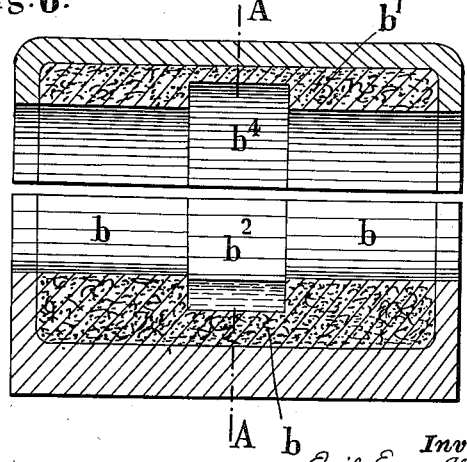

In the latter case the inner lining $b$ will have, as shown in Figs. 5 and 6, a recessed part $b^2$, intended to receive the lubricating oil, and permitting, in the case of a ring lubricator for instance, of the passage of the movable ring. A recess $b^4$ may also be made in the lining $b^1$ contained in the cap $d$.

Into the recessed part $b^2$ there opens a duct $f$ cut in the body of the lubricator $a$ through which duct the lubricating oil is introduced.

Of course the apparatus described above is only given by way of illustration the present bush device being capable of being applied to bearings of all kinds.

The main advantages of the present bush device are the following:—

1. Economy of manufacture, since the frame may be made of a cheap metal and the lining composition itself is inexpensive.

2. Economy of lubrication, since the bush itself is a lubricant—or even elimination of lubrication in some cases.

3. Elimination of all risk of heating.

What I claim and desire to secure by Letters Patent of the United States is:—

1. A bush or bearing consisting of a frame of any material and a lining consisting of an agglomerate composed of a lubricating substance and magnesia mounted inside the said framing.

2. A bush or bearing consisting of a frame of any material and a lubricating lining consisting of an agglomerate composed of graphite, magnesia and a binding medium.

3. A bush or bearing consisting of a frame of any material and a lining consisting of a lubricating agglomerate composed of ground graphite and powdered magnesia, mixed together and with a solution of chlorid of magnesium.

4. A bush or bearing consisting of a frame of any material and a lining consisting of an agglomerate composed of a lubricating substance, magnesia, both, in a pulverized state, and a solid fatty body.

5. A bush or bearing consisting of a frame of any material and a lining consisting of a lubricating agglomerate composed of ground graphite and powdered magnesia, mixed together and with a solution of chlorid of magnesium and of a solid fatty body.

6. A lubricator bearing comprising a frame of any material, a lining consisting of a lubricating agglomerate, having a recess formed in the said lubricating agglomerate, the said recess being intended for the reception of lubricating oil.

In testimony whereof I affix my signature in presence of two witnesses.

EMILE EUGÈNE ALBERT SOREL.

Witnesses:
 CHAS. P. PRESSLY,
 FRANÇOIS WEBER.